(12) United States Patent
Juzak et al.

(10) Patent No.: US 10,100,865 B2
(45) Date of Patent: Oct. 16, 2018

(54) FASTENING SYSTEM

(71) Applicant: J. Van Walraven Holding B.V., Mijdrecht (NL)

(72) Inventors: Marek Juzak, Mijdrecht (NL); Frank Nijdam, Zeewolde (NL)

(73) Assignee: J. Van Walraven Holding B.V., Mijdrecht (NL)

( * ) Notice: Subject to any disclaimer, the term of this patent is extended or adjusted under 35 U.S.C. 154(b) by 453 days.

(21) Appl. No.: 14/909,131

(22) PCT Filed: Aug. 29, 2013

(86) PCT No.: PCT/NL2013/050626
§ 371 (c)(1),
(2) Date: Jan. 31, 2016

(87) PCT Pub. No.: WO2015/030571
PCT Pub. Date: Mar. 5, 2015

(65) Prior Publication Data
US 2018/0156251 A1    Jun. 7, 2018

(51) Int. Cl.
*F16B 37/04* (2006.01)
*E04C 3/07* (2006.01)
(Continued)

(52) U.S. Cl.
CPC ............ *F16B 37/046* (2013.01); *E04C 3/07* (2013.01); *F16B 7/0433* (2013.01); *F16L 3/24* (2013.01)

(58) Field of Classification Search
CPC .... F16B 37/045; F16B 37/046; F16B 7/0433; E04B 2001/2415; E04B 1/5818; E04C 3/07; E04C 3/09
See application file for complete search history.

(56) References Cited

U.S. PATENT DOCUMENTS 5,118,069 A * 6/1992 Muhlethaler ............. E04B 9/18
248/613
5,799,907 A    9/1998 Andronica
(Continued)

FOREIGN PATENT DOCUMENTS

DE    4444413 A1    6/1996
DE    29824254 U1   9/2000
(Continued)

OTHER PUBLICATIONS

International Search Report and Written Opinion from priority PCT Application No. PCT/NL2013/050626, dated Jun. 11, 2014.

*Primary Examiner* — Jonathan P Masinick
(74) *Attorney, Agent, or Firm* — Troutman Sanders LLP; Ryan A. Schneider

(57) ABSTRACT

A fastening system comprises in combination a fastening unit (20) and a steel installation channel (1) having a bottom wall (2) and opposite the bottom wall flanges (5) which extend towards each other and which delimit between them a longitudinal slot (6) extending over the length of the installation channel. The bottom wall (2) comprises two side strips (2A) and a central strip (2B) located between the side strips, which central strip is arranged recessed with regard to the plane defined by the side strips, and has oblong openings (7). The fastening unit comprises an oblong anchoring element and tensioning means. In use the anchoring body with its longitudinal axis can be inserted between the longitudinal edges of the oblong opening and between the flanges delimiting the longitudinal slot.

12 Claims, 2 Drawing Sheets

Figure 4:
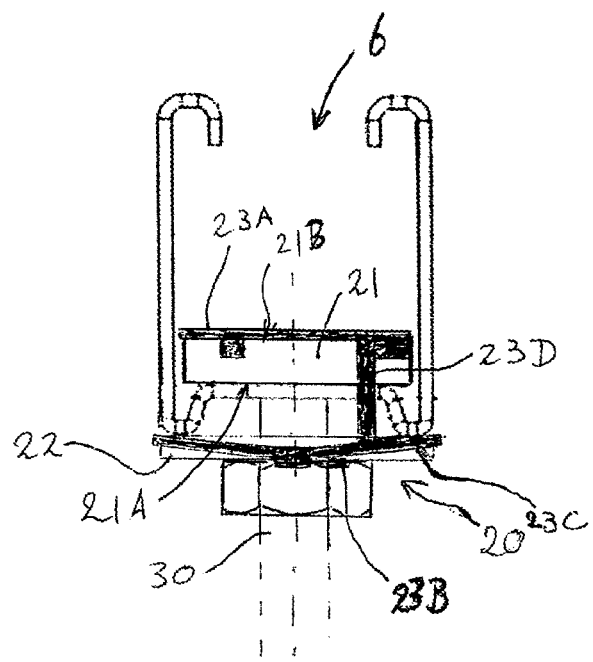

(51) Int. Cl.
*F16B 7/04* (2006.01)
*F16L 3/24* (2006.01)

(56) References Cited

U.S. PATENT DOCUMENTS

| | | | |
|---|---|---|---|
| 7,246,547 B2 * | 7/2007 | van Walraven | B25B 13/02 |
| | | | 411/104 |
| 7,984,601 B2 * | 7/2011 | Birnbaum | E04C 3/065 |
| | | | 52/220.1 |
| 8,132,992 B2 * | 3/2012 | van Walraven | F16B 37/046 |
| | | | 411/112 |
| 8,833,040 B2 * | 9/2014 | van Walraven | E04C 3/07 |
| | | | 52/650.1 |
| 2003/0185643 A1 | 10/2003 | Thompson | |
| 2004/0165947 A1 * | 8/2004 | Herb | F16B 37/046 |
| | | | 403/374.3 |

FOREIGN PATENT DOCUMENTS

| | | |
|---|---|---|
| EP | 1039154 A1 | 9/2000 |
| FR | 1256922 A | 3/1961 |

\* cited by examiner

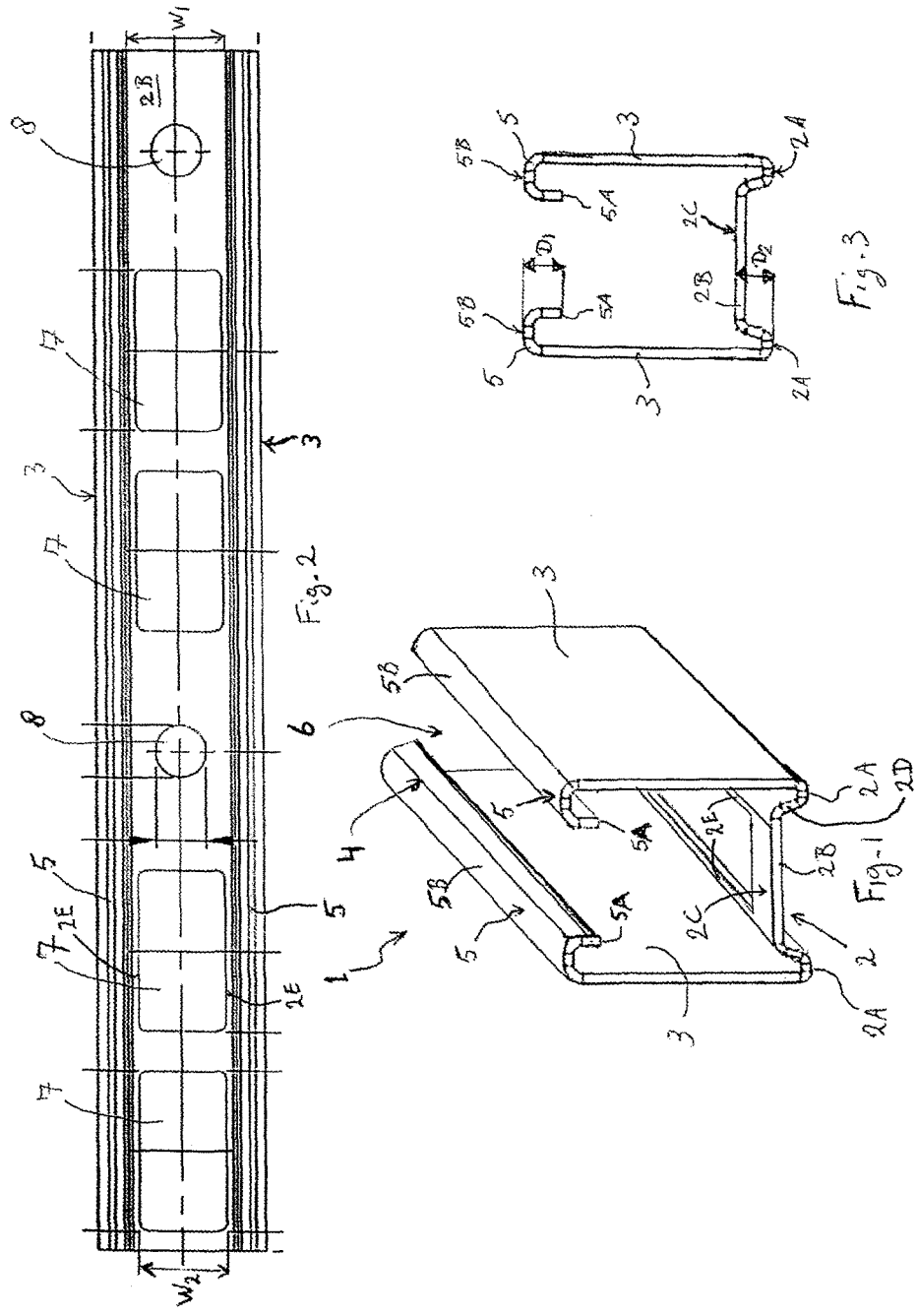

FASTENING SYSTEM

CROSS-REFERENCE TO RELATED APPLICATIONS

This application is a United States National Stage Application of International Patent Application Serial No. PCT/NL2013/050626, filed 29 Aug. 2013, which is herein fully incorporated by reference.

The present invention relates to a fastening system comprising a steel installation channel and a fastening unit.

Such fastening systems are well known in the art and are used for all kinds of installation purposes, for example for installation of piping. An example of such a fastening system is shown in WO 2007/008060. An installation channel with inwardly bended flange edges is known for example from U.S. Pat. No. 2,696,139 and in the relevant technical field is often referred to as a "strut rail".

The invention has for an object to provide an improved fastening system.

This object is achieved by a fastening system comprising in combination:
  a steel installation channel for installation of pipe clips or other accessories, said installation channel having a bottom wall, sidewalls extending from the bottom wall substantially at right angles and an upper side opposite the bottom wall,
  wherein the upper side comprises flanges which extend from the respective sidewalls towards each other and which delimit between them a longitudinal slot extending over the length of the installation channel,
  wherein the flanges are bended inwards such that the free end of the flanges is directed towards the bottom wall and extends in a direction substantially at right angles with the bottom wall,
  wherein the bottom wall comprises two side strips and a central strip located between the side strips, which central strip is arranged recessed with regard to the plane defined by the side strips, and wherein oblong openings are provided in the central strip; and
  a fastening unit to be mounted to the installation channel, comprising an oblong anchoring element and a head portion that is connected to the anchoring element and extends above the upper side of the anchoring element, which head portion can be gripped by hand, and wherein the fastening unit furthermore comprises tensioning means connected to the anchoring element,
  wherein the oblong anchoring element has an upper side facing the head portion and an underside opposite the upper side, and has a width which is only slightly smaller than the width of the longitudinal slot of the installation channel and a length which is greater than the width of the longitudinal slot of the installation channel, such that in use the anchoring body with its longitudinal axis can be aligned with the longitudinal slot and, with its underside facing the bottom of the installation channel, inserted between the flanges into the installation channel, after which the anchoring element can be rotated so as to engage the flanges with its upper side, wherein the tensioning means in the mounted state clamp the upper side of the anchoring element against the free end of the flanges, and the head portion against the upper side of the flanges, and
  wherein the width of the oblong anchoring element is smaller than the width of the oblong openings in the bottom wall of the installation channel and the length of the oblong anchoring element is greater than the width of said oblong openings such that in use the anchoring body with its longitudinal axis can be aligned with the longitudinal axis of the oblong opening and, with its underside facing the top side of the installation channel, inserted between the longitudinal edges of the oblong opening into the installation channel, after which the anchoring element can be rotated so as to engage the longitudinal edges with its upper side, wherein the tensioning means in the mounted state clamp the upper side of the anchoring element against the edges of the oblong opening, and the head portion against the side strips of the bottom wall.

According to the invention the inner edge regions adjacent the oblong openings in the bottom wall operate as an engagement surface for the anchoring element, while the side strips of the bottom wall operate as engagement surfaces for a counter part of the fastening unit, such as a washer or spring member(s). Such a structure allows that fastening units that are adapted to be used with installation channels of the "strut rail type", i.e. with flanges that are folded to point with their free ends towards the bottom wall of the channel, can be used on the bottom side of the installation channel.

Typically the installation channel is made of steel with a thickness of 1.5-3 mm.

The longitudinal slot of the upper side of the installation channel preferably has a width which substantially corresponds to or is slightly smaller than the width of the central strip of the bottom wall of the channel element.

The longitudinal slot of the upper side may have a width which substantially corresponds to the width of the oblong openings in the central strip of the bottom of the channel element. Thereby the same fastening units can be mounted to the upper side and the bottom side of the installation channel.

In a possible embodiment the head portion of the fastening unit includes a washer.

In a further embodiment the head portion of the fastening unit includes a spring member for engaging the upper side of the flanges or the side strips of the bottom wall so as to bias the anchoring element against the free end of the flanges or the edges of the oblong opening.

Figure 5:
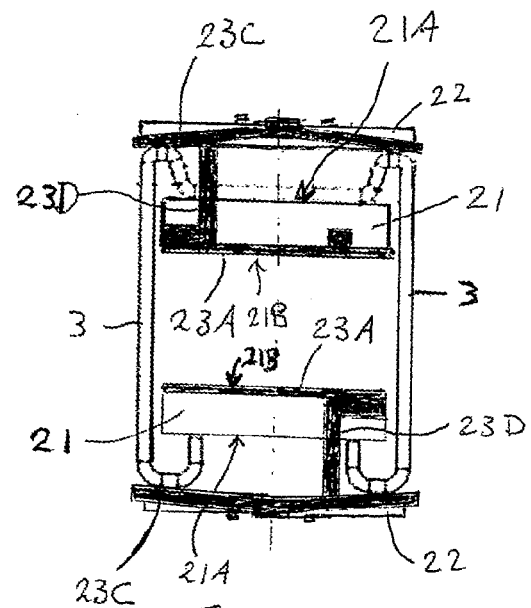

The invention will be elucidated in the following description with reference to the drawing, in which:

FIG. 1 shows a view in perspective of an installation channel for a fastening system according to the invention, FIG. 2 shows a top elevational view of the installation channel of FIG. 1, FIG. 3 shows a cross sectional view of the installation channel of FIG. 1, FIG. 4 shows a cross section of the installation channel of FIG. 1 with a fastening unit mounted on it, and FIG. 5 shows a cross section of the installation channel of FIG. 1 with a fastening unit mounted on the top side and the bottom side of the channel in a preassembly state.

FIG. 1 shows an installation channel 1. The installation channel 1 is made of metal with a thickness of minimal 1.5 mm, in particular the shown embodiment is made of steel with a thickness of about 2 mm thickness. The installation channel comprises a bottom wall 2, two sidewalls 3 extending from the bottom wall 2 substantially at right angles and an upper side 4 opposite the bottom wall 2.

The upper side 4 comprises flanges 5 which extend from the respective sidewalls 3 towards each other and which delimit between them a longitudinal slot 6 extending over the length of the installation channel 1.

The flanges 5 are bended inwards such that the free ends 5A of the flanges 5 are directed towards the bottom wall 2 and extends in a direction substantially at right angles with the bottom wall 2. The flanges 5 have an upper engagement surface 5B, which in the embodiment shown is curved. The highest point of the upper engagement surface 5B has a distance $D_1$ from the free end 5A of the flange 5 as is indicated in FIG. 3.

The bottom wall 2 of the installation channel is formed having two longitudinal side strips 2A and a longitudinal central strip 2B located between the side strips 2A. The central strip 2B is arranged recessed with regard to the plane defined by (extreme points of) the side strips 2A. The distance between the plane defined by the outer surface of side strips 2A and the inner surface 2C of the central strip 2B is $D_2$ as is indicated in FIG. 3.

Between the side strips 2A and the central strip 2B a transition wall portion 2D is formed.

In the central strip 2B openings are provided. As can be seen in FIG. 2 there are provided oblong openings 7 and round openings 8. The oblong openings 7 have in the specific embodiment shown a rectangular shape.

The oblong openings 7 in the bottom 2 have a longitudinal axis that is parallel with the longitudinal axis of the installation channel 1.

The oblong openings 7 may have approximately the same width $W_2$ as the central strip as is shown in the figures, but may also have a smaller width $W_2$.

The oblong openings 7 each have a peripheral edge that defines them. Said peripheral edge is located only in the central strip 2B. In other words, the oblong openings 7 do not extend into the transition portion 2D between the side strips and the central strip 2B or into the side strips 2A.

The flanges 5 define two parallel planes at a distance $D_1$ at which a fastening unit can engage, as will be described below. The bottom wall 2 with a recessed middle longitudinal strip 2B with respect to the outer longitudinal strips 2B defines two parallel planes at a distance $D_2$ at which a fastening unit can engage, as will also be described below.

The installation channel typically has a height of about 40 mm but may have different heights, anywhere between about 20-80 mm. The embodiment shown has a height of about 50 mm. The profile of the installation channel 1 is made by rolling. The installation channels are typically delivered in profile lengths of about 6 m.

The user can cut of the channel profile to the desired length and mount it directly to a support structure such as a ceiling or a wall. Alternatively, the installation channel 1 can be suspended from a structure by means of (threaded) support rods, as will become clear below.

In FIG. 4 is shown how a fastening unit 20 is attached to the installation rail 1. The fastening unit 20 can be mounted on the bottom 2 or on the upper side 4 of the installation channel 1 as can be seen in FIG. 4.

The fastening unit 20 comprises an oblong anchoring element 21. The anchoring element 21 is preferably made of steel and has an underside 21B and an upper side 21A. The anchoring element 21 has a width which is only slightly smaller than the width $W_1$ of the longitudinal slot 6 and width $W_2$ of the oblong openings 7 in the bottom 2 of the installation channel 1. The oblong anchoring element 21 has a length which is greater than the width $W_1$ of the longitudinal slot 6 and the width $W_2$ of the oblong openings 7, such that in use the anchoring element 21 with its longitudinal axis can be aligned with the longitudinal slot 6 or the longitudinal axis of one of the oblong openings 7. Then, with its underside 21B facing the bottom 2 of the profile element 1 (see FIG. 5) or - when inserted in an oblong opening 7, as is shown in FIG. 4 and FIG. 5, - facing the upper side 4 of the installation channel 1, the anchoring element 21 is inserted between the flanges 5 or between the side edges of the oblong opening 7 into the installation channel 1. Next, the anchoring element 21 can be rotated around an axis perpendicular to the upper side 4 and the bottom 2 of the installation channel 1.

The fastening unit 20 furthermore comprises a metal washer 22 which in the preassembled state is situated a small distance above the engagement surface 5B of flanges 5 of the profile element 1.

The fastening unit 20 also comprises a support element 23 which is made of plastics material. The support element 23 carries the oblong anchoring element 21 and supports it from on the underside 21B with a bottom portion 23A. The support element 23 furthermore has a head portion which is situated above the bottom portion and which is coupled to the washer 22 by means of studs 23B extending through holes in the washer 22. The head portion is connected to the bottom portion 23A by means of legs 23D.

The head portion of the support element 23 furthermore comprises a pair of generally half-ring shaped spring members 23C which extend from the level of the washer 22 in an inclined fashion downwards as can be seen in FIG. 5. The spring members 23C of the respective fastening units in FIG. 5 engage the upper side 5B of the flanges 5 and the side strips 2A of the bottom wall 2 respectively in the pre-assembly state shown in FIG. 5. The resiliency of the spring members 23C pulls the bottom portion 23C with the anchoring member 21 towards the bottom wall 2 or towards the upper side 4 of the channel 1 such that the upper side 21A of the anchoring member 21 is brought into engagement with edge regions 2E of the surface 2C flanking the oblong opening 7, or, if the fastening unit is mounted to the upper side 4, into engagement with the end portions 5A of the flanges 5.

The anchoring element 21 preferably has a threaded hole (not shown) in it in which a bolt or a threaded rod 30 can be screwed. The washer 22 has a central hole, through which the bolt or rod 30 extends. In FIG. 4 is shown the situation in which a threaded rod 30 is in cooperation with the fastening unit 20. When the bolt is tensioned or a nut 31 (see FIG. 4) is screwed from above on the threaded rod 30, the washer 22 is tensioned from the preassembly state into engagement with the side strips 2A of the bottom wall 2 of the channel. If the fastening unit 20 is mounted to the upper side 4 of the channel 1, the washer 22 is tensioned from the preassembly state into engagement with the upper engagement surfaces 5B of the flanges 5.

The oblong openings 7 preferably have a width which corresponds substantially with the width of the slot 6, such that the same fastening units can be mounted on the top side as well as on the bottom side of the installation channel 1. This is illustrated in FIG. 5, where two the same fastening units 10 are mounted on the bottom side 2 and the top side 4 of the installation channel 1 respectively. Thus an installation channel can for example be suspended by threaded rods from a support structure, while on the other side pipe clips can be suspended from the installation channel. In this regard it is in particular advantageous when the distances $D_1$ and $D_2$ are equal or substantially equal.

In a specific practical embodiment the distances $D_1$ and $D_2$ are 7-8 mm. The width $W_1$ of the longitudinal slot and the width $W_2$ of the oblong openings 7 is in a possible embodiment about 22 mm, wherein both widths $W_1$, $W_2$ may slightly differ from each other due to tolerances.

The invention claimed is:

1. Fastening system comprising in combination:
   a steel installation channel having a bottom wall, sidewalls extending from the bottom wall substantially at right angles and an upper side opposite the bottom wall;
   wherein the upper side comprises flanges which extend from the respective sidewalls towards each other and which delimit between them a longitudinal slot extending over the length of the installation channel;
   wherein the flanges are bended inwards such that the free end of the flanges is directed towards the bottom wall and extends in a direction substantially at right angles with the bottom wall; and
   wherein the bottom wall comprises two side strips and a central strip located between the side strips, which central strip is arranged recessed with regard to the plane defined by the side strips, and wherein oblong openings are provided in the central strip; and
   a fastening unit to be mounted to the installation channel, comprising an oblong anchoring element and a head portion that is connected to the anchoring element and extends above the upper side of the anchoring element, which head portion can be gripped by hand, and wherein the fastening unit furthermore comprises tensioning means connected to the anchoring element;
   wherein the oblong anchoring element has an upper side facing the head portion and an underside opposite the upper side, and has a width which is only slightly smaller than the width of the longitudinal slot of the installation channel and a length which is greater than the width of the longitudinal slot of the installation channel, such that in use the anchoring body with its longitudinal axis can be aligned with the longitudinal slot and, with its underside facing the bottom wall of the installation channel, inserted between the flanges into the installation channel, after which the anchoring element can be rotated so as to engage the flanges with its upper side, wherein the tensioning means in the mounted state clamp the upper side of the anchoring element against the free end of the flanges, and the head portion against the upper side of the flanges; and
   wherein the width of the oblong anchoring element is smaller than the width of the oblong openings in the bottom wall of the installation channel and the length of the oblong anchoring element is greater than the width of said oblong openings such that in use the anchoring body with its longitudinal axis can be aligned with the longitudinal axis of the oblong opening and, with its underside facing the top side of the installation channel, inserted between the longitudinal edges of the oblong opening into the installation channel, after which the anchoring element can be rotated so as to engage the longitudinal edges with its upper side, wherein the tensioning means in the mounted state clamp the upper side of the anchoring element against the edges of the oblong opening, and the head portion against the side strips of the bottom wall.

2. The fastening system according to claim 1, wherein the installation channel is made of steel with a thickness of between 1.5-3 mm.

3. The fastening system according to claim 1, wherein the longitudinal slot of the upper side has a width which substantially corresponds to the width of the central strip of the bottom wall of the channel element.

4. The fastening system according to claim 1, wherein the longitudinal slot of the upper side has a width which substantially corresponds to the width of the oblong openings in the central strip of the bottom wall of the channel element.

5. The fastening system according to claim 1, wherein the head portion of the fastening unit includes a washer.

6. The fastening system according to claim 1, wherein the head portion of the fastening unit includes a spring member for biasing the anchoring element against the free end of the flanges or the edges of the oblong opening.

7. A fastening system comprising:
   an installation channel having a bottom wall, sidewalls extending from the bottom wall and an upper side opposite the bottom wall;
   wherein the upper side comprises flanges that extend from the respective sidewalls towards each other and that delimit between them a longitudinal slot extending over a length of the installation channel;
   wherein the flanges are bent inwards such that a free end of the flanges is directed towards the bottom wall; and
   wherein the bottom wall comprises two side strips and a central strip located between the side strips, which central strip is arranged recessed with regard to a plane defined by the side strips, and wherein openings are provided in the central strip; and
   a fastening unit capable of being mounted to the installation channel, the fastening unit comprising:
      an anchoring element and a head portion that is connected to the anchoring element and extends above the upper side of the anchoring element, which head portion is capable of being gripped by hand; and
      a tension mechanism connected to the anchoring element;
   wherein the anchoring element has an upper side facing the head portion and an underside opposite the upper side, and has a width smaller than the width of the longitudinal slot of the installation channel and a length which is greater than the width of the longitudinal slot of the installation channel, such that in use the anchoring body with its longitudinal axis is capable of being aligned with the longitudinal slot and, with its underside facing the bottom wall of the installation channel, inserted between the flanges into the installation channel, after which the anchoring element is capable of being rotated so as to engage the flanges with its upper side, wherein the tension mechanism in a mounted state clamps the upper side of the anchoring element against the free end of the flanges, and the head portion against the upper side of the flanges; and
   wherein the width of the anchoring element is smaller than the width of the openings in the bottom wall of the installation channel and the length of the anchoring element is greater than the width of the openings such that in use the anchoring body with its longitudinal axis is capable of being aligned with the longitudinal axis of the openings and, with its underside facing the top side of the installation channel, inserted between the longitudinal edges of the openings into the installation channel, after which the anchoring element is capable of being rotated so as to engage the longitudinal edges with its upper side, wherein the tension mechanism in the mounted state clamps the upper side of the anchoring element against the edges of the openings, and the head portion against the side strips of the bottom wall.

8. The fastening system according to claim 7, wherein the installation channel comprises steel with a thickness in the range of 1.5-3 mm.

9. The fastening system according to claim 7, wherein the longitudinal slot of the upper side has a width that substantially corresponds to the width of the central strip of the bottom wall of the channel element.

10. The fastening system according to claim 7, wherein the longitudinal slot of the upper side has a width that substantially corresponds to the width of the openings in the central strip of the bottom wall of the channel element.

11. The fastening system according to claim 7, wherein the head portion of the fastening unit includes a washer.

12. The fastening system according to claim 7, wherein the head portion of the fastening unit includes a spring member for biasing the anchoring element against one or both of the free end of the flanges and the edges of the openings.

\* \* \* \* \*